US006664339B2

(12) United States Patent
Schmiegel et al.

(10) Patent No.: US 6,664,339 B2
(45) Date of Patent: Dec. 16, 2003

(54) CURABLE BASE-RESISTANT FLUOROELASTOMERS

(75) Inventors: Walter Werner Schmiegel, Wilmington, DE (US); Phan Linh Tang, West Chester, PA (US)

(73) Assignee: DuPont Dow Elastomers LLC, Wilmington, DE (US)

( * ) Notice: Subject to any disclaimer, the term of this patent is extended or adjusted under 35 U.S.C. 154(b) by 54 days.

(21) Appl. No.: 10/138,069

(22) Filed: May 2, 2002

(65) Prior Publication Data
US 2003/0004277 A1 Jan. 2, 2003

Related U.S. Application Data
(60) Provisional application No. 60/290,905, filed on May 15, 2001.

(51) Int. Cl.[7] .......................... C08L 27/12; C08L 27/18; C08L 29/10
(52) U.S. Cl. .................. 525/326.4; 525/326.3; 525/359.3; 525/368; 525/384
(58) Field of Search ............................ 525/326.4, 326.3, 525/359.3, 368, 384

(56) References Cited

U.S. PATENT DOCUMENTS

| 4,529,784 | A | 7/1985 | Finlay |
| 4,694,045 | A | 9/1987 | Moore |
| 5,985,983 | A | 11/1999 | Yamada et al. |
| 6,329,042 | B1 | 12/2001 | Yamada et al. |
| 6,329,469 | B1 | 12/2001 | Bowers et al. |

FOREIGN PATENT DOCUMENTS

| JP | 5224956 | 7/1977 |
| WO | WO 9702301 | 1/1997 |

*Primary Examiner*—D. R. Wilson

(57) ABSTRACT

A base resistant, substantially amorphous fluoroelastomer comprising (1) 10–40 mole percent ethylene units, (2) 32–60 mole percent tetrafluoroethylene units, (3) 20–40 mole percent perfluoro ether units selected from the group consisting of perfluoro(alkyl vinyl ethers), perfluoro(alkyl alkenyl ethers) and perfluoro(alkoxy alkenyl ethers), and (4) 0.1 to 15 mole percent of a cure site monomer selected from the group consisting of i) 3,3,3-trifluoropropene-1, ii) trifluoroethylene, iii) 1,2,3,3,3-pentafluoropropylene, iv) 1,1,3,3,3-pentafluoropropylene, and v) 2,3,3,3-tetrafluoropropene. Such fluoroelastomers may be vulcanized with polyhydroxy curatives. The resulting vulcanized fluoroelastomer compositions are resistant to attack by amines, strong bases and hydrogen sulfide and possess a combination of good low temperature and high temperature properties and they are resistant to oil swell.

12 Claims, No Drawings

CURABLE BASE-RESISTANT FLUOROELASTOMERS

CROSS-REFERENCE TO RELATED APPLICATIONS

This application claims the benefit of U.S. Provisional Application No. 60/290,905 filed May 15, 2001.

FIELD OF THE INVENTION

This invention relates to polyhydroxy curable fluoroelastomers comprising copolymerized units of 1) ethylene, 2) a perfluoro ether such as a perfluoro(alkyl vinyl ether) or a perfluoro(alkyl or alkoxy alkenyl ether), 3) tetrafluoroethylene, and 4) a cure site monomer selected from the group consisting of i) 3,3,3-trifluoropropene-1, ii) trifluoroethylene, iii) 1,2,3,3,3-pentafluoropropylene, iv) 1,1,3,3,3-pentafluoropropylene, and v) 2,3,3,3-tetrafluoropropene.

BACKGROUND OF THE INVENTION

Base resistant specialty fluoroelastomers made from copolymers of ethylene (E), a perfluoro(alkyl vinyl ether) (PAVE), tetrafluoroethylene (TFE) and a cure site monomer are known in the art (U.S. Pat. No. 4,694,045). In addition to being resistant to attack by strong bases, these fluoroelastomers have good sealing properties at both low and high temperatures and exhibit low swell in oil.

In order to fully develop physical properties such as tensile strength, elongation, and compression set, elastomers must be cured, i.e. crosslinked. In the case of fluoroelastomers, this is generally accomplished by mixing uncured polymer (i.e. fluoroelastomer gum) with a polyfunctional curing agent and heating the resultant mixture, thereby promoting chemical reaction of the curing agent with active sites along the polymer backbone or side chains. Interchain linkages produced as a result of these chemical reactions cause formation of a crosslinked polymer composition having a three-dimensional network structure. Commonly used curing agents for fluoroelastomers include difunctional nucleophilic reactants, such as polyhydroxy compounds or diamines. Alternatively, peroxidic curing systems containing organic peroxides and unsaturated coagents, such as polyfunctional isocyanurates, may be employed.

U.S. Pat. No. 4,694,045 discloses several cure site monomers which may be incorporated into E/PAVE/TFE specialty fluoroelastomers. These include brominated or iodinated alpha-olefins, and various halogenated vinyl ethers. Such fluoroelastomers may be cured with peroxides or tin compounds, but not polyhydroxy curatives. However, in many end use applications, it would be beneficial to be able to cure E/PAVE/TFE fluoroelastomers with polyhydroxy compounds because of the improved mold release properties and superior resistance to compression set (i.e. lower compression set) that is imparted by this type of crosslinking system.

Thus, it would be particularly desirable to have an improved specialty E/PAVE/TFE fluoroelastomer that is resistant to alkaline fluids and oil swell and which readily crosslinks with polyhydroxy cure systems to form cured articles having good tensile properties and compression set resistance.

SUMMARY OF THE INVENTION

It has been surprisingly found that the introduction of a cure site monomer selected from the group consisting of i) 3,3,3-trifluoropropene-1, ii) trifluoroethylene, iii) 1,2,3,3,3-pentafluoropropylene, iv) 1,1,3,3,3-pentafluoropropylene, and v) 2,3,3,3-tetrafluoropropene into ethylene/perfluoro ether/tetrafluoroethylene copolymers improves the polyhydroxy curing of these specialty fluoroelastomers without significantly diminishing the resistance of these fluoroelastomers to alkaline fluids or oil and without significantly altering the low and high temperature sealing capabilities of these fluoroelastomers. The resulting cured fluoroelastomer articles have excellent compression set resistance and tensile properties.

Accordingly, an aspect of the present invention is a specialty fluoroelastomer comprising copolymerized units of 10 to 40 mole percent ethylene; 20 to 40 mole percent of a perfluoro ether selected from the group consisting of perfluoro(alkyl vinyl ethers), perfluoro(alkyl alkenyl ethers) and perfluoro(alkoxy alkenyl ethers); 32–60 mole percent tetrafluoroethylene; and 0.1 to 15 mole percent of a cure site monomer selected from the group consisting of i) 3,3,3-trifluoropropene-1, ii) trifluoroethylene, iii) 1,2,3,3,3-pentafluoropropylene, iv) 1,1,3,3,3-pentafluoropropylene, and v) 2,3,3,3-tetrafluoropropene.

Another aspect of this invention is a curable fluoroelastomer composition comprising A) a specialty fluoroelastomer comprising copolymerized units of 10 to 40 mole percent ethylene; 20 to 40 mole percent of a perfluoro ether selected from the group consisting of perfluoro(alkyl vinyl ethers), perfluoro (alkyl alkenyl ethers) and perfluoro(alkoxy alkenyl ethers); 32–60 mole percent tetrafluoroethylene; and 0.1 to 15 mole percent of a cure site monomer selected from the group consisting of i) 3,3,3-trifluoropropene-1, ii) trifluoroethylene, iii) 1,2,3,3,3-pentafluoropropylene, iv) 1,1,3,3,3-pentafluoropropylene, and v) 2,3,3,3-tetrafluoropropene;

B) 0.1 to 20 parts by weight per 100 parts fluoroelastomer of a polyhydroxy curing agent;

C) 1 to 30 parts by weight per 100 parts fluoroelastomer of an acid acceptor; and D) 0.1 to 20 parts per 100 parts fluoroelastomer of a vulcanization accelerator.

The polyhydroxy curing agent and vulcanization accelerator may be present as separate components or as the salt of the curing agent and accelerator.

DETAILED DESCRIPTION OF THE INVENTION

Fluoroelastomers of this invention comprise copolymerized units of 1) ethylene (E), 2) a perfluoro ether selected from the group consisting of perfluoro(alkyl vinyl ethers) (PAVE), perfluoro(alkyl alkenyl ethers) and perfluoro (alkoxy alkenyl ethers), 3) tetrafluoroethylene (TFE), and 4) a cure site monomer selected from the group consisting of i) 3,3,3-trifluoropropene-1 (TFP), ii) trifluoroethylene (TrFE), iii) 1,2,3,3,3-pentafluoropropylene (1-HPFP), iv) 1,1,3,3,3-pentafluoropropylene (2-HPFP), and v) 2,3,3,3-tetrafluoropropene.

Minor amounts (i.e. less than about 20 mole percent total) of other copolymerizable monomers may also be present in the fluoroelastomers of this invention. Examples of such monomers include, but are not limited to chlorotrifluoroethylene; vinyl fluoride; propylene; isobutene; and bromine- or iodine-containing cure site monomers such as $CF_2=CFOCF_2CF_2CF_2OCF_2CF_2Br$; 1-bromo-2,2-difluoroethylene; bromotrifluoroethylene; 4-bromo-3,3,4,4- tetrafluorobutene-1,4-bromo-1,1,2-trifluorobutene-1; 2-bromoperfluoro(ethyl vinyl) ether; 3-bromoperfluoro (propyl vinyl) ether; and 4-iodo-3,3,4,4-tetrafluorobutene-1. Alternatively, bromine or iodine cure sites may optionally be introduced onto the fluoroelastomer polymer chain ends by use of iodinated or brominated chain transfer agents such as methylene iodide or 1,4-diiodoperfluoro-butane during polymerization. The presence of brominated or iodinated groups permits the fluoroelastomers of this invention to be cured by organic peroxides in addition to polyhydroxy curatives.

Generally the fluoroelastomers of this invention contain between 10 to 40 (preferably between 20 to 40) mole percent copolymerized units of ethylene, based on the total moles of copolymerized monomers. Less ethylene adversely effects the low temperature sealing performance of the fluoroelastomers, while more ethylene adversely effects the base resistance and oil swell resistance properties of the fluoroelastomers.

The fluoroelastomers of this invention typically contain between 20 to 40 (preferably between 20 to 30) mole percent copolymerized units of a perfluoro ether selected from the group consisting of perfluoro(alkyl vinyl ethers), perfluoro (alkyl alkenyl ethers) and perfluoro(alkoxy alkenyl ethers), based on the total moles of copolymerized monomers. Less perfluoro ether will negatively impact the low temperature sealing performance of the fluoroelastomers of the invention, while more perfluoro ether causes the polymer to be more expensive to produce.

Perfluoro(alkyl vinyl ethers) suitable for use as monomers include those of the formula:

   (I)

where $R_f$ and $R_{f'}$ are different linear or branched perfluoroalkylene groups of 2–6 carbon atoms, m and n are independently 0–10, and $R_f$ is a perfluoroalkyl group of 1–6 carbon atoms.

A preferred class of perfluoro(alkyl vinyl ethers) includes compositions of the formula:

   (II)

where X is F or $CF_3$, n is 0–5, and $R_f$ is a perfluoroalkyl group of 1–6 carbon atoms.

A most preferred class of perfluoro(alkyl vinyl ethers) includes those ethers wherein n is 0 or 1 and $R_f$ contains 1–3 carbon atoms. Examples of such perfluorinated ethers include perfluoro(methyl vinyl ether) (PMVE) and perfluoro (propyl vinyl ether) (PPVE). Other useful monomers include compounds of the formula:

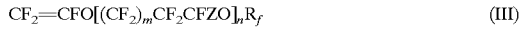   (III)

where $R_f$ is a perfluoroalkyl group having 1–6 carbon atoms, m=0 or 1, n=0–5, and Z=F or $CF_3$.

Preferred members of this class are those in which $R_f$ is $C_3F_7$, m=0, and n=1.

Additional perfluoro(alkyl vinyl ether) monomers include compounds of the formula:

   (IV)

where m and n independently=0–10, p=0–3, and x=1–5. Preferred members of this class include compounds where n=0–1, m=0–1, and x=1.

Additional examples of useful perfluoro(alkyl vinyl ethers) include:

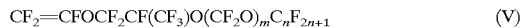   (V)

where n=1–5, m=1–3, and where, preferably, n=1.

Perfluoro(alkyl alkenyl ethers) suitable for use as monomers include those of the formula VI:

   (VI)

where $R_f$ is a perfluorinated linear or branched aliphatic group containing 1–20, preferably 1–10, and most preferably 1–4 carbon atoms and n is an integer between 1 and 4. Specific examples include, but are not limited to perfluoro (propoxyallyl ether) and perfluoro(propoxybutenyl ether).

Perfluoro(alkoxy alkenyl ethers) differ from perfluoro (alkyl alkenyl ethers) in that $R_f$ in formula VI contains at least one oxygen atom in the aliphatic chain. A specific example includes, but is not limited to perfluoro (methoxyethoxyallyl ether).

Also contained in the fluoroelastomers of this invention is between 32–60 (preferably 40 to 50) mole percent copolymerized units of tetrafluoroethylene, based on the total moles of copolymerized monomers. Less TFE will adversely effect oil swell resistance whereas higher levels of TFE may introduce crystallinity, thus negatively impacting elastomer properties such as elongation and compression set.

The fluoroelastomers of this invention also contain 0.1 to 15 (preferably 2 to 10, most preferably 2–6) mole percent (based on the total moles of copolymerized monomers) of copolymerized units of a cure site monomer. The cure site monomer is selected from the group consisting of i) 3,3,3-trifluoropropene-1, ii) trifluoroethylene, iii) 1,2,3,3,3-pentafluoropropylene, iv) 1,1,3,3,3-pentafluoropropylene, and v) 2,3,3,3-tetrafluoropropene.

It is believed that during the polyhydroxy curing process, some copolymerized units of the cure site monomer, which are located adjacent to tetrafluoroethylene units in the fluoroelastomer polymer chain, dehydrofluorinate to form sites of unsaturation (i.e. C—C double bonds). These unsaturated sites are then available to react with polyhydroxy curatives to form crosslinks. Fluoroelastomers containing less than 0.1 mole percent units of one of these cure site monomers do not form a sufficient number of crosslinks to yield a cured product having desirable tensile properties for most end uses. Fluoroelastomers containing more than 15 mole percent of these cure site monomers are not desirable because i) the polymerization rate is reduced and ii) the base resistance property of the fluoroelastomer is reduced.

The fluoroelastomers of this invention are generally prepared by free radical emulsion or suspension polymerization. Preferably, the polymerizations are carried out in continuous, batch, or semi-batch emulsion processes well known in the art. The resulting fluoroelastomer latexes are usually coagulated by addition of electrolytes. The precipitated polymer is washed with water and then dried, for example in an air oven, to produce a substantially dry fluoroelastomer gum.

In a semi-batch emulsion polymerization process, a gaseous monomer mixture of a desired composition (initial monomer charge) is introduced into a reactor which contains an aqueous solution. Generally, the pH of the aqueous solution is controlled to between 1 and 8 (preferably 3–7), depending upon the type of fluoroelastomer being made. In addition, the initial aqueous solution may contain a nucleating agent, such as a fluoroelastomer seed polymer prepared previously, in order to promote fluoroelastomer latex particle formation and thus speed up the polymerization process.

The initial monomer charge contains a quantity of TFE, E, perfluoro ether and cure site monomer. The amount of monomer mixture contained in the initial charge is set so as to result in a reactor pressure between 0.5 and 10 MPa.

The monomer mixture is dispersed in the aqueous medium and, optionally, a chain transfer agent may also be added at this point while the reaction mixture is agitated, typically by mechanical stirring.

The temperature of the semi-batch reaction mixture is maintained in the range of 25° C.–130°C., preferably 50° C.–100° C. Polymerization begins when the initiator either thermally decomposes or reacts with reducing agent and the resulting radicals react with dispersed monomer.

Additional quantities of the gaseous major monomers and cure site monomer (incremental feed) are added at a controlled rate throughout the polymerization in order to maintain a constant reactor pressure at a controlled temperature. The polymerization pressure is controlled in the range of 0.5 to 10 MPa, preferably 1 to 6.2 MPa.

Polymerization times in the range of from 2 to 30 hours are typically employed in this semi-batch polymerization process.

A suitable continuous emulsion polymerization process differs from the semi-batch process in the following manner. In the continuous process, gaseous monomers and solutions of other ingredients such as water-soluble monomers, chain transfer agents, buffer, bases, polymerization initiator, surfactant, etc., are fed to the reactor in separate streams at a constant rate. The temperature of the continuous process reaction mixture is maintained in the range of 25° C.–130° C., preferably 80° C.–120° C.

Curable compositions of this invention contain the fluoroelastomer of this invention, a polyhydroxy curative, an acid acceptor and a vulcanization (or curing) accelerator. In the case of fluoroelastomers which contain bromine or iodine atom cure sites, the curable compositions of this invention may, optionally, also contain an organic peroxide and a multifunctional curing coagent. Cured articles resulting from the latter compositions contain crosslinks due to both the polyhydroxy and peroxide curing systems and are sometimes referred to in the art as dual cured elastomers.

The curable compositions of the invention contain between 0.1 to 20 parts by weight (preferably 1–3 parts) of polyhydroxy crosslinking agent per 100 parts fluoroelastomer. Typical polyhydroxy cross-linking agents include di-, tri-, and tetrahydroxybenzenes, naphthalenes, and anthracenes, and bisphenols of the formula:

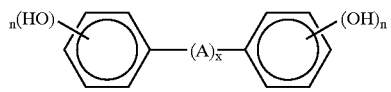

where A is a difunctional aliphatic, cycloaliphatic, or aromatic radical of 1–13 carbon atoms, or a thio, oxy, carbonyl, sulfinyl, or sulfonyl radical; A may optionally be substituted with at least one chlorine or fluorine atom; x is 0 or 1; n is 1 or 2; and any aromatic ring of the polyhydroxylic compound may optionally be substituted with at least one chlorine or fluorine atom, an amino group, a —CHO group, or a carboxyl or acyl radical. Phenolate salts are also active crosslinking agents, such as the dipotassium salt of bisphenol AF. Preferred polyhydroxy compounds include hexafluoroisopropylidene-bis(4-hydroxy-benzene) (i.e. bisphenol AF); 4,4'-isopropylidene diphenol (i.e. bisphenol A); 4,4'-dihydroxydiphenyl sulfone; and diaminobisphenol AF. Referring to the bisphenol formula shown above, when A is alkylene, it can be for example methylene, ethylene, chloroethylene, fluoroethylene, difluoroethylene, propylidene, isopropylidene, tributylidene, heptachlorobutylidene, hepta-fluorobutylidene, pentylidene, hexylidene, and 1,1-cyclohexylidene. When A is a cycloalkylene radical, it can be for example 1,4-cyclohexylene, 2-chloro-1,4-cyclohexylene, cyclopentylene, or 2-fluoro-1,4-cyclohexylene. Further, A can be an arylene radical such as m-phenylene, p-phenylene, o-phenylene, methyl-phenylene, dimethylphenylene, 1,4-naphthylene, 3-fluoro-1,4-naphthylene, and 2,6-naphthylene. Polyhydroxyphenols of the formula:

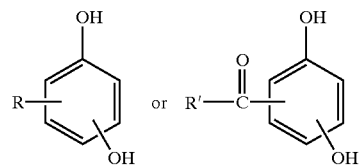

where R is H or an alkyl group having 1–4 carbon atoms or an aryl group containing 6–10 carbon atoms and R' is an alkyl group containing 1–4 carbon atoms also act as effective crosslinking agents. Examples of such compounds include hydroquinone, catechol, resorcinol, 2-methylresorcinol, 5-methyl-resorcinol, 2-methylhydroquinone, 2,5-dimethylhydroquinone, 2-t-butyl-hydroquinone; and such compounds as 1,5-dihydroxynaphthalene and 2,6-dihydroxynaphthalene.

Additional polyhydroxy curing agents include alkali metal salts of bisphenol anions, quaternary ammonium salts of bisphenol anions, tertiary sulfonium salts of bisphenol anions and quaternary phosphonium salts of bisphenol anions. For example, the salts of bisphenol A and bisphenol AF. Specific examples include the disodium salt of bisphenol AF, the dipotassium salt of bisphenol AF, the monosodium monopotassium salt of bisphenol AF and the benzyltriphenylphosphonium salt of bisphenol AF.

Quaternary ammonium and phosphonium salts of bisphenol anions and their preparation are discussed in U.S. Pat. Nos. 4,957,975 and 5,648,429. Bisphenol AF salts (1:1 molar ratio) with quaternary ammonium ions of the formula $R_1R_2R_3R_4N^+$, wherein $R_1$–$R_4$ are $C_1$–$C_8$ alkyl groups and at least three of $R_1$–$R_4$ are $C_3$ or $C_4$ alkyl groups are preferred. Specific examples of these preferred compositions include the 1:1 molar ratio salts of tetrapropyl ammonium-, methyltributylammonium- and tetrabutylammonium bisphenol AF. Such salts may be made by a variety of methods. For instance a methanolic solution of bisphenol AF may be mixed with a methanolic solution of a quaternary ammonium salt, the pH is then raised with sodium methoxide, causing an inorganic sodium salt to precipitate. Alternatively, a methanolic solution of bisphenol AF may first be neutralized with a molar equivalent of base (such as sodium methoxide). The quaternary ammonium salt is then added and an inorganic salt precipitates. After filtration, the tetraalkylammonium/BPAF salt may be isolated from solution by evaporation of the methanol. In another method for preparing the curative/accelerator salt, a methanolic solution of tetraalkylammonium hydroxide may be employed in place of the solution of quaternary ammonium salt, thus eliminating the precipitation of an inorganic salt and the need for its removal prior to evaporation of the methanol.

In addition, derivatized polyhydroxy compounds, such as mono- or diesters and trimethylsilyl ethers, are useful crosslinking agents. Examples of such compositions include diesters of phenols, such as the diacetate of bisphenol AF, the diacetate of sulfonyl diphenol, and the diacetate of hydroquinone.

The curable compositions of the invention also contain between 1 to 30 parts by weight (preferably 1 to 15 parts) of an acid acceptor per 100 parts fluoroelastomer. The acid acceptor is typically a strong organic base such as Proton Sponge® (available from Aldrich) or an oxirane, or an inorganic base such as a metal oxide, metal hydroxide, or a mixture of 2 or more of the latter. Metal oxides or hydroxides which are useful acid acceptors include calcium hydroxide, magnesium oxide, lead oxide, and calcium oxide. Calcium hydroxide and magnesium oxide are preferred.

Vulcanization accelerators which may be used in the curable compositions of the invention include tertiary sulfonium salts such as $[(C_6H_5)_2S^+(C_6H_{13})][Cl]^-$, and $[(C_6H_{13})_2S(C_6H_5)]^+[CH_3CO_2]^-$ and quaternary ammonium, phosphonium, arsonium, and stibonium salts of the formula $R_5R_6R_7R_8Y^+X^-$, where Y is phosphorous, nitrogen, arsenic, or antimony; $R_5$, $R_6$, $R_7$, and $R_8$ are individually $C_1$–$C_{20}$ alkyl, aryl, aralkyl, alkenyl, alkoxy and the chlorine, fluorine, bromine, cyano, —OR, and —COOR substituted analogs thereof, with R being $C_1$–$C_{20}$ alkyl, aryl, aralkyl, alkenyl, and where X is halide, hydroxide, sulfate, sulfite, carbonate, pentachlorothiophenolate, tetrafluoroborate, hexafluorosilicate, hexafluorophosphate, dimethyl phosphate, and $C_1$–$C_{20}$ alkyl, aryl, aralkyl, and alkenyl carboxylates and dicarboxylates. Particularly preferred are benzyltri-phenylphosphonium chloride, benzyltriphenylphosphonium bromide, tetrabutylammonium hydrogen sulfate, tetrabutylammonium hydroxide, tetrapropylammonium hydroxide, tetrabutylammonium bromide, tributylallylphosphonium chloride, tributyl-2-methoxypropylphosphonium chloride, 1,8-diazabicyclo[5.4.0]undec-7-ene, and benzyldiphenyl(dimethylamino)phosphonium chloride. Other useful accelerators include methyltrioctylammonium chloride, methyltributylammonium chloride, tetrapropylammonium chloride, benzyltrioctylphosphonium bromide, benzyltrioctylphosphonium chloride, methyltrioctylphosphonium acetate, tetraoctylphosphonium bromide, methyltriphenylarsonium tetrafluoroborate, tetraphenylstibonium bromide, 4-chlorobenzyltriphenyl phosphonium chloride, 8-benzyl-1,8-diazabicyclo(5.4.0)-7-undecenonium chloride, diphenylmethyltriphenylphosphonium chloride, allyltriphenylphosphonium chloride, tetrabutylphosphonium bromide, m-trifluoromethyl-benzyltrioctylphosphonium chloride, and other quaternary compounds disclosed in U.S. Pat. Nos. 5,591,804; 4,912,171; 4,882,390; 4,259,463; 4,250,278 and 3,876,654. The amount of accelerator used is between 0.1 and 20 parts by weight per hundred parts fluoroelastomer. Preferably, 0.5–3.0 parts accelerator per hundred parts fluoroelastomer is used.

Optionally, the curable compositions of the invention may contain a second curing agent in the form of a combination of an organic peroxide and a multifunctional (i.e. polyunsaturated) coagent compound. Examples of organic peroxides which are particularly effective curing agents for fluoroelastomers include dialkyl peroxides or bis(dialkyl peroxides) which decompose at a temperature above 50° C. In many cases one will prefer to use a di-t-butylperoxide having a tertiary carbon atom attached to a peroxy oxygen. Among the most useful are 2,5-dimethyl-2,5-di(t-butylperoxy)hexyne-3 and 2,5-dimethyl-2,5-di(t-butylperoxy)hexane. Other peroxides can be selected from such compounds as dicumyl peroxide, dibenzoyl peroxide, t-butyl perbenzoate, and di[1,3-dimethyl-3-(t-butyl-peroxy)butyl]carbonate. Multifunctional coagents which cooperate with such peroxides to provide curing systems include methacrylates, allyl compounds, divinyl compounds, and polybutadienes. Specific examples of coagents include one or more of the following compounds: triallyl cyanurate; triallyl isocyanurate; tris(diallylamine-s-triazine); triallyl phosphite; hexaallyl phosphoramide, N,N-diallyl acrylamide; N,N,N'N'-tetraallyl terephthalamide; N,N,N',N'-tetraallyl malonamide; trivinyl isocyanurate; 2,4,6-trivinylmethyltrisiloxane; and tri(5-norbornene-2-methylene)cyanurate. If a peroxide cure system is present in the compounds of the invention, the organic peroxide is generally at a level between 0.2 to 7 parts by weight (preferably 1 to 3 parts) per 100 parts fluoroelastomer and the coagent is present at a level of 0.1 to 10 (preferably 2 to 5) parts by weight per 100 parts fluoroelastomer.

The curable composition of the invention may contain other additives, commonly used in elastomer compounding and processing. The latter may be introduced into the composition before addition of the curative, simultaneously with it, or following the addition. Typical additives include fillers, plasticizers, processing aids, antioxidants, pigments, and the like. The amount of such ingredients which is added will depend on the particular end use applications for which the cured compositions are adapted. Fillers, such as carbon black, clays, barium sulfate, calcium carbonate, magnesium silicate, and fluoropolymers are generally added in amounts of from 5–100 parts by weight per 100 parts fluoroelastomer. The amount of plasticizer used is generally from 0.5–5.0 parts by weight per 100 parts fluoroelastomer. Typical plasticizers include esters, such as dioctyl phthalate and dibutyl sebacate. Processing aids are generally used in amounts of from 0.1–2.0 parts by weight per 100 parts fluoroelastomer. Suitable processing aids include octadecylamine, tetramethylene sulfone, p-chlorophenyl sulfone, and waxes, for example, carnauba wax, that aid in the processing of the compositions.

The fluoroelastomer, polyhydroxy curative, acid acceptor, accelerator and any other ingredients are generally incorporated into the curable compositions of the invention by means of an internal mixer or rubber mill. The resulting composition may then be shaped (e.g. molded or extruded) and cured. Curing typically takes place at about 150°–200° C. for 1 to 60 minutes. Conventional rubber curing presses, molds, extruders, and the like provided with suitable heating and curing means can be used. Also, for maximum heat resistance and dimensional stability, it is preferred to carry out a post curing operation wherein the molded or extruded article is heated in an oven or the like for an additional period of about 1–48 hours, typically at from about 180°–275° C., generally in an air atmosphere.

The polymers of the invention and curable compositions of the invention result in cured fluoroelastomer articles which have unusually good base resistance, tensile properties and compression set resistance. Such articles find application as gaskets, seals and tubing, particularly in automotive end uses.

The invention is now illustrated by the following embodiments in which all parts are by weight unless otherwise indicated.

EXAMPLES

Test Methods

Physical properties of the compositions described in the examples were measured according to the following test procedures.

| | |
|---|---|
| Mooney Scorch | ASTM D1646 |
| Oscillating Disc Rheometer (ODR) | ASTM D2084 |
| Moving Disc Rheometer (MDR) | ASTM D5289 |
| Tensile Strength ($T_B$) | ASTM D412 |
| Modulus ($M_{100}$) | ASTM D412 |
| Elongation at Break ($E_B$) | ASTM D412 |
| Hardness | ASTM D2240 |
| Compression Set-B | ASTM D395 |

Example 1

A polymer of the invention (Polymer 1) was prepared by a continuous emulsion polymerization process, carried out at 110° C. in a well-stirred 4.0-liter stainless steel liquid full reaction vessel. An aqueous solution, consisting of 2.7 g/hour (g/h) ammonium persulfate, 22.2 g/h sodium phosphate dibasic heptahydrate, and 22.2 g/h of ammonium perfluorooctanoate, was fed to the reactor at a rate of 2 L/hour. The reactor was maintained at a liquid-full level at a pressure of 6.2 MPa by means of a backpressure control valve in the effluent line. After 30 minutes, polymerization was initiated by introduction of a gaseous monomer mixture consisting of 6.1 wt. % ethylene (E), 36.9 wt. % tetrafluoroethylene (TFE), 51.3 wt. % perfluoro(methyl vinyl ether) (PMVE) and 5.8 wt. % 1,1,3,3,3-pentafluoropropylene (2 H-PFP) fed through a diaphragm compressor. After 2.0 hours, collection of effluent dispersion was begun and lasted for 6 hours. The effluent polymer dispersion, which had a pH of 4.4 and contained 26 wt. % solids, was separated from residual monomers in a degassing vessel at atmospheric pressure. The resulting fluoroelastomer latex was coagulated by addition of an aqueous calcium nitrate solution, filtered and then the fluoroelastomer was washed with deionized water. The wet crumb was dried in an air oven at approximately 50°–65° C. to a moisture content of less than 1 wt. %. About 4 kg of polymer was recovered at an overall conversion of 77.6%. The product, composed of 7.8 wt. % ethylene, 44.2 wt. % TFE, 47.0 wt. % PMVE and 1.0 wt. % 2 H-PFP units, was an amorphous fluoroelastomer having a glass transition temperature of −10° C., as determined by differential scanning calorimetry (heating mode, 10° C./minute, inflection point of transition). Mooney viscosity, ML-10 (121° C.), was 50.

Example 2

A polymer of the invention (Polymer 2) was prepared by a semi-batch emulsion polymerization process, carried out at 80° C. in a well-stirred reaction vessel. A 33-liter, horizontally agitated reactor was charged with 20 liters of deionized, deoxygenated water, 200 g of ammonium perfluorooctanoate and 100 g of sodium phosphate dibasic heptahydrate. The reactor was heated to 80° C. and then pressurized to 2.07 MPa with a mixture of 14.5 wt. % TFE, 85.3 wt. % PMVE and 0.2 wt. % 3,3,3-trifluoropropene-1 (TFP). A 35 ml sample of a 10 wt. % ammonium persulfate initiator aqueous solution was then added. A mixture of 7.7 wt. % ethylene, 42.3 wt. % TFE, 47.0 wt. % PMVE and 3.0 wt. % TFP was supplied to the reactor to maintain a pressure of 2.07 MPa throughout the polymerization. The initiator solution was fed continuously at 15 ml/hour through the end of the reaction period. After a total of 8000 g monomer mixture was supplied to the reactor, monomer addition was discontinued and the reactor was purged of residual monomer. The total reaction time was 12 hours. The resulting fluoroelastomer latex was coagulated by addition of an aqueous calcium nitrate solution, filtered and the fluoroelastomer was washed with deionized water. The polymer crumb was dried for two days at 60° C. The product, composed of 7.7 wt. % ethylene, 42.3 wt. % TFE, 47.0 wt. % PMVE and 3.0 wt. % TFP, was an amorphous fluoroelastomer having a glass transition temperature of −10° C., as determined by differential scanning calorimetry (heating mode, 10° C./minute, inflection point of transition). Mooney viscosity, ML-10 (121° C.), was 99.

Example 3

A polymer of the invention (Polymer 3) was prepared by a continuous emulsion polymerization process, carried out at 90° C. in a well-stirred 4.0-liter stainless steel liquid full reaction vessel. An aqueous solution, consisting of 1.94 g/hour (g/h) ammonium persulfate, 16.0 g/h sodium phosphate dibasic heptahydrate, and 7.0 g/h of ammonium perfluorooctanoate, was fed to the reactor at a rate of 1.2 L/hour. The reactor was maintained at a liquid-full level at a pressure of 6.2 MPa by means of a backpressure control valve in the effluent line. After 60 minutes, polymerization was initiated by introduction of a gaseous monomer mixture consisting of 6.3 wt. % ethylene, 36.6 wt. % TFE, 55.9 wt. % PMVE and 1.2 wt. % TFP fed through a diaphragm compressor. After 4.0 hours, collection of effluent dispersion was begun and continued for 20 hours. The effluent polymer dispersion, which had a pH of 6 and contained 26 wt. % solids, was separated from residual monomers in a degassing vessel at atmospheric pressure. The resulting fluoroelastomer latex was coagulated by addition of calcium nitrate aqueous solution, filtered and washed with deionized water. The wet crumb was dried in an air oven at approximately 50°–65° C. to a moisture content of less than 1 wt. %. About 8 kg of polymer was recovered at an overall conversion of 77%. The product, composed of 8.4 wt. % ethylene, 43.2 wt. % TFE, 46.6 wt. % PMVE and 1.8 wt. % TFP units, was an amorphous fluoroelastomer having a glass transition temperature of −9° C., as determined by differential scanning calorimetry (heating mode, 10° C./minute, inflection point of transition). Mooney viscosity, ML-10 (121 °C.), was 76.

Control A

A control polymer (Control Polymer A) of the prior art was made by substantially according to the process used to prepare Polymer 1 in Example 1, except that the monomer mixture was comprised of 6 wt. % ethylene, 38 wt. % TFE, 55 wt. % PMVE and 1 wt. % 4-bromo-3,3,4,4-tetrafluorobutene-1 (BTFB). The resulting fluoroelastomer had a composition of about 8 wt. % E, 44 wt. % PMVE and 47 wt. % TFE and 1 wt. % BTFB with a ML-10 (121° C.) of about 50).

Example 4

A curable composition of the invention (Sample 1) was made by mixing Polymer 1 prepared above with a polyhydroxy curative, acid acceptor, vulcanization accelerator and other ingredients on a conventional two-roll rubber mill, using standard mixing techniques employed in the elastomer industry. A comparative curable composition (Comparative Sample A) was made by a similar procedure except that i) a fluoroelastomer of the prior art was employed (Control Polymer A prepared above), which contained BTFB cure site monomer rather than a cure site monomer used in the fluoroelastomers of this invention, and ii) the comparative composition was crosslinked with a peroxide curing system. The formulations are shown in Table I.

Curing characteristics, tensile properties and compression set resistance were measured according to the Test Methods. ODR measurements were of slabs at 1770° C.–3° arc, 24 minute motor. Tensiles and compression set were measured on slabs which had been press cured for 10 minutes at 177° C., followed by a postcure of 24 hours at 200° C. in air. The results are also shown in Table I. Cured slabs resulting from the bisphenol curable composition of the invention (Sample 1) had much better compression set than slabs resulting from the peroxide curable composition of the prior art (Comparative Sample A).

TABLE I

| Ingredient, phr[1] | Comp. Sample A | Sample 1 |
|---|---|---|
| Control Polymer A | 100 | 0 |
| Polymer 1 | 0 | 100 |
| Diak 7[2] | 2.25 | 0 |
| Luperco ® 101XL[3] | 2.25 | 0 |
| TBAHS[4] | 0 | 2.5 |
| Bisphenol AF | 0 | 2.5 |
| Zinc Oxide | 6 | 0 |
| Magnesium Oxide | 0 | 3 |
| Calcium Hydroxide | 0 | 6 |
| MT Carbon Black | 30 | 30 |
| Curing Characteristics | | |
| $M_L$, dN · m | 27.1 | 22.3 |
| $M_H$, dN · m | 74.2 | 108 |
| $t_s2$, minutes | 1.2 | 1.4 |
| tc90, minutes | 9.5 | 8.5 |
| Tensile Properties | | |
| $M_{100}$, MPa | 5.0 | 4.3 |
| $T_B$, MPa | 9.7 | 6.9 |
| $E_B$, % | 235 | 230 |
| Hardness, Shore A | 74 | 76 |
| Compression Set | | |
| @150° C., 70 hours, % | 57 | 23 |
| @200° C., 70 hours, % | 63 | 39 |

[1]phr is parts by weight per 100 parts by weight rubber (i.e. elastomer)
[2]triallyl isocyanurate available from DuPont Dow Elastomers
[3]45% 2,5-dimethyl-2,5-di(t-butyl peroxy) hexane and 55% inert filler available from ATOFINA
[4]tetrabutylammonium hydrogen sulfate Example 5

A curable composition of the invention (Sample 2) was made by mixing Polymer 3 prepared above with a polyhydroxy curative, acid acceptor, vulcanization accelerator and other ingredients on a conventional two-roll rubber mill, using standard mixing techniques employed in the elastomer industry. A comparative curable composition (Comparative Sample B) was made by the same procedure except that a fluoroelastomer of the prior art was employed (Control Polymer A prepared above), which contained BTFB cure site monomer. The formulations are shown in Table II.

Curing characteristics (MDR at 200° C., 24 minutes) were measured according to the Test Methods. The results are also shown in Table II. Sample 2 (a composition of the invention) cured faster than Comparative Sample B (tc90 of 4.32 min. vs. 16.7 min.) and reached a higher state of cure ($M_H$–$M_L$ of 9.07 vs. 1.74).

TABLE II

| Ingredient, phr[1] | Comp. Sample B | Sample 2 |
|---|---|---|
| Control Polymer A | 100 | 0 |
| Polymer 3 | 0 | 100 |
| TBAHS[2] | 1.96 | 1.96 |
| Bisphenol AF | 1.5 | 1.5 |
| Maglite D[3] | 5.0 | 5.0 |
| Calcium Hydroxide | 3.0 | 3.0 |
| Curing Characteristics | | |
| $M_L$, dN · m | 0.70 | 0.75 |
| $M_H$, dN · m | 2.44 | 9.82 |
| tc50, minutes | 6.0 | 2.4 |
| tc90, minutes | 16.7 | 4.3 |

[1]phr is parts by weight per 100 parts by weight rubber (i.e. elastomer)
[2]tetrabutylammonium hydrogen sulfate
[3]magnesium oxide available from C.P. Hall Example 6

A curable composition of the invention (Sample 3) was made by mixing Polymer 2 prepared above with a polyhydroxy curative, acid acceptor, vulcanization accelerator and other ingredients on a conventional two-roll rubber mill, using standard mixing techniques employed in the elastomer industry. A comparative curable composition (Comparative Sample B) was made by a similar procedure except that i) a fluoroelastomer of the prior art was employed (Control Polymer A prepared above), which contained 4-bromo-3,3, 4,4-tetrafluorobutene-1 (BTFB) cure site monomer rather than a cure site monomer used in the fluoroelastomers of this invention, and ii) the comparative composition was crosslinked with a peroxide curing system. The formulations are shown in Table III.

Curing characteristics, tensile properties and compression set resistance were measured according to the Test Methods. ODR measurements were of slabs at 177° C.–3° arc, 24 minute motor. Tensiles and compression set were measured on slabs which had been process cured for 10 minutes at 177° C., followed by a postcure of 24 hours at 232° C. in air. The results are also shown in Table III. Cured slabs resulting from the bisphenol curable composition of the invention (Sample 1) had much better compression set than slabs resulting from the peroxide curable composition of the prior art (Comparative Sample A).

TABLE III

| Ingredient, phr[1] | Comp. Sample B | Sample 3 |
|---|---|---|
| Control Polymer A | 100 | 0 |
| Polymer 2 | 0 | 100 |
| Diak 7[2] | 2.50 | 0 |
| Luperco ® 101XL[3] | 2.50 | 0 |
| Bisphenol AF Salt[4] | 0 | 3.15 |
| Zinc Oxide | 6 | 0 |
| Magnesium Oxide | 0 | 3 |
| Calcium Hydroxide | 0 | 6 |
| MT Carbon Black | 30 | 30 |
| Curing Characteristics | | |
| $M_L$, dN · m | 26.2 | 47.1 |
| $M_H$, dN · m | 76.7 | 128.8 |
| $t_s2$, minutes | 1.3 | 0.8 |
| tc90, minutes | 9.7 | 3.1 |
| Tensile Properties | | |
| $M_{100}$, MPa | 5.6 | 9.0 |
| $T_B$, MPa | 15 | 13 |

TABLE III-continued

| Ingredient, phr[1] | Comp. Sample B | Sample 3 |
|---|---|---|
| $E_B$, % | 275 | 165 |
| Hardness, Shore A | 73 | 77 |
| Compression Set | | |
| @150° C., 70 hours, % | 48 | 34 |
| @200° C., 70 hours, % | 53 | 47 |

[1]phr is parts by weight per 100 parts by weight rubber (i.e. elastomer)
[2]triallyl isocyanurate available from DuPont Dow Elastomers
[3]45% 2,5-dimethyl-2,5-di(t-butyl peroxy) hexane and 55% inert filler available from ATOFINA
[4]methyltributylammonium BPAF salt 1:1 molar ratio

What is claimed is:

1. A curable fluoroelastomer composition comprising:

A) a specialty fluoroelastomer comprising copolymerized units of 10 to 40 mole percent ethylene; 20 to 40 mole percent perfluoro ether selected from the group consisting of perfluoro(alkyl vinyl ethers), perfluoro(alkyl alkenyl ethers) and perfluoro(alkoxy alkenyl ethers); 32–60 mole percent tetrafluoroethylene; and 0.1 to 15 mole percent of a cure site monomer selected from the group consisting of i) 3,3,3-trifluoropropene-1, ii) trifluoroethylene, iii) 1,2,3,3,3-pentafluoropropylene, iv) 1,1,3,3,3-pentafluoropropylene, and v) 2,3,3,3-tetrafluoropropene;

B) 0.1 to 10 parts by weight per 100 parts fluoroelastomer of a polyhydroxy curing agent;

C) 1 to 20 parts by weight per 100 parts fluoroelastomer of an acid acceptor; and D) 0.1 to 10 parts per 100 parts fluoroelastomer of a vulcanization accelerator.

2. A curable fluoroelastomer composition of claim 1 wherein said specialty fluoroelastomer comprises copolymerized units of ethylene present in an amount between 20 and 40 mole percent; said copolymerized units of perfluoro ether in an amount between 20 and 30 mole percent; said copolymerized units of tetrafluoroethylene in an amount between 40 and 50 mole percent and said copolymerized units of cure site monomer in an amount between 2 and 10 mole percent.

3. A curable fluoroelastomer composition of claim 2 wherein said cure site monomer is 3,3,3-trifluoropropene-1.

4. A curable fluoroelastomer composition of claim 1 wherein said perfluoro ether in said specialty fluoroelastomer is perfluoro(methyl vinyl ether).

5. A curable fluoroelastomer composition of claim 1 further comprising E) 0.2 to 7 parts by weight per 100 parts fluoroelastomer of an organic peroxide and F) 0.1 to 10 parts by weight per 100 parts fluoroelastomer of a multifunctional coagent.

6. A curable fluoroelastomer composition of claim 1 wherein said polyhydroxy curing agent B is a curing agent selected from the group consisting of i) dihydroxy-, trihydroxy-, and tetrahydroxy-benzenes, -naphthalenes, and -anthracenes;

ii) bisphenols of the formula:

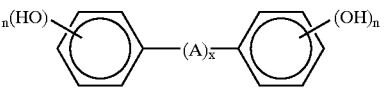

where A is a stable divalent radical; x is 0 or 1; and n is 1 or 2;

iii) dialkali salts of said bisphenols, iv) quaternary ammonium and phosphonium salts of said bisphenols, v) tertiary sulfonium salts of said bisphenols, and vi) esters of phenols.

7. A curable fluoroelastomer composition of claim 1 wherein said vulcanization accelerator D is chosen from the group consisting of quaternary ammonium salts, tertiary sulfonium salts and quaternary phosphonium salts.

8. A curable fluoroelastomer composition of claim 7 wherein said cure accelerator D is selected from the group consisting of i) quaternary ammonium salts of said polyhydroxy crosslinking agent (B), ii) quaternary phosphonium salts of said polyhydroxy crosslinking agent (B) and iii) tertiary sulfonium salts of said polyhydroxy crosslinking agent.

9. A curable fluoroelastomer composition comprising:

A) a specialty fluoroelastomer comprising copolymerized units of 10 to 40 mole percent ethylene; 20 to 40 mole percent perfluoro ether selected from the group consisting of perfluoro(alkyl vinyl ethers), perfluoro(alkyl alkenyl ethers) and perfluoro(alkoxy alkenyl ethers); 32–60 mole percent tetrafluoroethylene; and 0.1 to 15 mole percent of a cure site monomer selected from the group consisting of i) 3,3,3-trifluoropropene-1, ii) trifluoroethylene, iii) 1,2,3,3,3-pentafluoropropylene, iv) 1,1,3,3,3-pentafluoropropylene, and v) 2,3,3,3-tetrafluoropropene;

B) a compound selected from the group consisting of i) quaternary ammonium salts of a bisphenol, ii) quaternary phosphonium salts of a bisphenol and iii) tertiary sulfonium salts of a bisphenol; and C) an acid acceptor.

10. A curable fluoroelastomer composition of claim 9 further comprising E) 0.2 to 7 parts by weight per 100 parts fluoroelastomer of an organic peroxide and F) 0.1 to 10 parts by weight per 100 parts fluoroelastomer of a multifunctional coagent.

11. A curable fluoroelastomer composition of claim 9 wherein said quaternary ammonium salt of a bisphenol is a 1:1 molar ratio salt of a quaternary ammonium compound and bisphenol AF.

12. A curable fluoroelastomer composition of claim 11 wherein said quaternary ammonium salt of bisphenol AF is selected from the group consisting of a) a tetrapropylammonium/bisphenol AF salt, b) a methyltributylammonium/bisphenol AF salt, and c) a tetrabutylammonium/bisphenol AF salt.

* * * * *